Patented Oct. 6, 1936

2,056,892

UNITED STATES PATENT OFFICE 2,056,892

PROCESS FOR THE MANUFACTURE OF SODIUM N-METHYL-C,C-ALLYL-ISOPROPYL BARBITURATE IN A STABLE, DRY STATE READILY SOLUBLE IN WATER

Otto Schnider, Basel, Switzerland, assignor to Hoffmann-La Roche Inc., Nutley, N. J., a corporation of New Jersey No Drawing. Application May 8, 1936, Serial No. 78,732. In Germany May 16, 1935

1 Claim. (Cl. 260—33)

It is difficult to obtain sodium N-methyl-C,C-allyl-isopropyl-barbiturate in a stable, dry state, readily soluble in water. If the solutions of this salt are evaporated to dryness, a hard crystalline mass is obtained. In this state the salt is unsuited for therapeutic purposes because it is very slowly soluble in water and its dosage is difficult. If the salt is ground, it is more easily soluble in water, but there is danger of decomposition during this process by atmospheric moisture and carbon dioxide. The preparation of the salt by precipitation from solutions is not possible, because even highly concentrated absolute alcoholic solutions are miscible with acetone, ether and benzene.

The dosage of hygroscopic salts for injection purposes can be carried out according to the process described in the Swiss Patent No. 153,032 by filling off the absolute alcoholic solutions in ampoules and evaporating the alcohol in vacuo. With sodium N-methyl-C,C-allyl-isopropyl-barbiturate however this process does not yield satisfactory results. After the alcohol has been evaporated, the salt remains as a coarse crystalline compact mass and is only dissolved in water by prolonged and vigorous shaking.

It has now been found that the sodium N-methyl-C,C-allyl-isopropyl-barbiturate may be obtained in a form readily soluble in water if a particular method is followed in evaporating the alcoholic solution in the ampoule. Contrary to the usual process, the evaporation is initially performed under reduced pressure slowly at ordinary temperature, preferably without a bath. When the solution is evaporated to a syrupy consistency it is quickly heated. Owing to the rapid evaporation of the last remnants of the alcohol the contents of the ampoule expand and solidify to a voluminous solid mass. In this form the salt is extraordinarily easily soluble in water and thus an injectable solution may be obtained in a short time.

The process for obtaining sodium N-methyl-C,C-allyl-isopropyl-barbiturate in a stable, dry state, very readily soluble in water may be carried out for instance as follows:

In a solution of 23 parts by weight of sodium in 300 parts by volume of methanol 224 parts by weight of N-methyl-C,C-allyl-isopropyl-barbituric acid are dissolved. The filtered solution is filled up with methanol to a volume of 738 parts. Quantities of 3 ccm. each of this solution are filled into ampoules of 10 ccm. content. The methanol is evaporated from these ampoules in vacuo without mechanical warming, until the residue has acquired a syrupy consistency. By dipping into water previously heated to 45° C. the last remnants of the methanol are quickly removed. The contents of the ampoules are thus inflated to about half the height of the ampoules and become crystalline. The ampoules are then filled with dry air free from carbon dioxide and sealed. They contain 1 gram each of the sodium salt of N-methyl-C,C-allyl-isopropyl-barbituric acid in a form readily soluble in water which can be used immediately.

I claim:

The process for the manufacture of sodium N-methyl-C,C-allyl-isopropyl-barbiturate in a stable, dry state very readily soluble in water, which consists in filling concentrated, alcoholic solutions of sodium N-methyl-C,C-allyl-isopropyl-barbiturate into ampoules, evaporating the solutions at ordinary temperature under reduced pressure to a syrupy consistency and then quickly heating in order to remove the remaining alcohol, whereby the contents of the ampoules crystallize as a voluminous inflated solid mass.

OTTO SCHNIDER.